Figure 1:
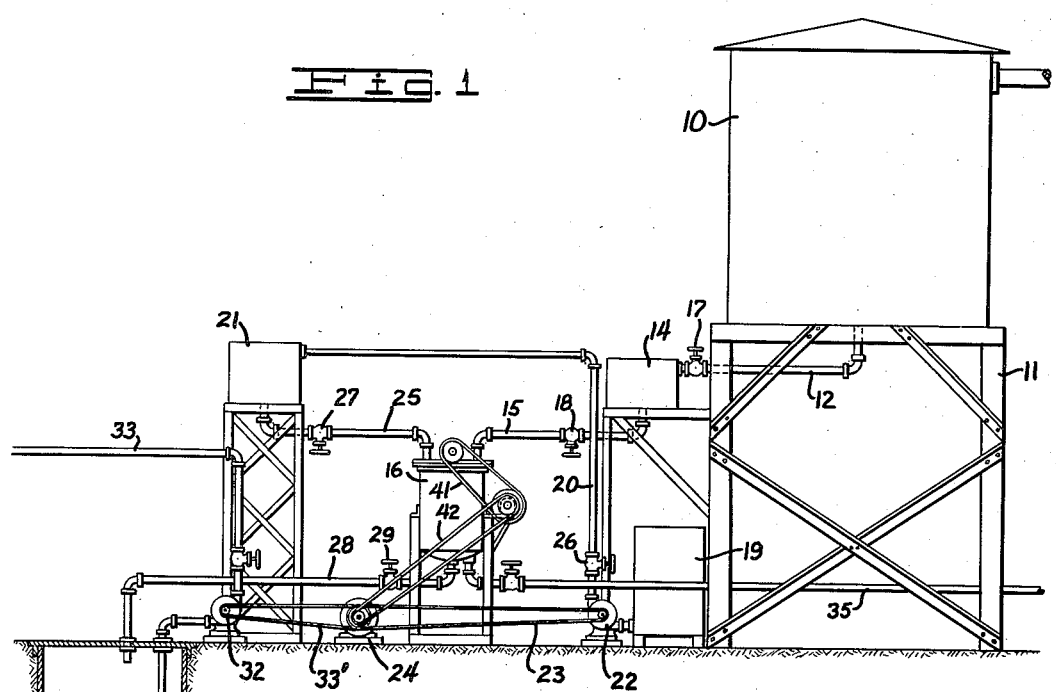

Dec. 10, 1935.  R. K. PAINTER ET AL  2,023,540
BITUMINOUS EMULSION
Filed Feb. 1, 1932

INVENTORS
ROBERT K. PAINTER.
HENRY H. MORETON.
BY CHARLES W. HILL.
ATTORNEY.

Patented Dec. 10, 1935

2,023,540

UNITED STATES PATENT OFFICE 2,023,540

BITUMINOUS EMULSION

Robert K. Painter, Los Angeles, Henry H. Moreton, Santa Monica, and Charles W. Hill, South Pasadena, Calif.

Application February 1, 1932, Serial No. 590,172

2 Claims. (Cl. 134—1)

This invention relates to bituminous emulsions.

The general objects of our invention are to provide an improved bituminous emulsion.

The effectiveness of asphalt or other bituminous emulsions depends, to a great extent, upon the fineness of dispersion (particle size) attained in the emulsification of the asphalt and water which is the liquid or exterior phase we prefer to employ. Not only must this fineness of dispersion be secured but to be of commercial importance the emulsion with the fineness of dispersion must be economically produced.

It has been the common practice heretofore to endeavor to secure this fineness of dispersion by the use of comparatively large percentages of emulsifying agents or by prolonged beating (often with intermediate cooling) or by the use of powerful, high speed so-called colloid mills. These means of obtaining the desired result are not all that could be desired. The use of excessive amounts of re-agents makes the product more easily reversible after application and the mechanical means mentioned are expensive to install and operate. As a result the product is not all that is required and the resultant expense is almost prohibitive.

With other processes the partially perfected emulsion is passed through a series of emulsifying machines and intercoolers in order to secure the desired fineness of dispersion but here again the desired result is not attained.

It is a well known fact that no asphalt emulsion of universal applicability has been produced. For instance, an emulsion having a high penetrating power and therefore useful in the construction of asphalt pavement, is valueless as a waterproofing because of lack of adhesiveness and, because of its sensitiveness, cannot be used in the production of pre-mixed asphaltic concrete. An emulsion which has splendid adhesiveness, will not penetrate crushed stone, brushes badly when applied as a paint, and tends to dry and skin over on the surface instead of "curing" uniformly throughout the depth of the film. This phenomenon discloses a serious defect as films of this kind will soon "alligator" and the retained moisture may oxidize or accelerate corrosion of the surface which the emulsion is being used to protect.

Our invention overcomes the difficulties mentioned and provides a novel emulsion and method of making the same whereby by simple steps and with simple apparatus we produce a single emulsion which is effective for waterproofing, paving, protective coatings, and as an admixture for plasticizing and waterproofing purposes.

In former practice various colloidal mineral substances, such as certain clays or bentonite, soap forming chemicals, depressants, vegetable colloids and gel forming substances have been proposed, and some of them used commercially, as emulsifying agents in the production of asphalt and other bituminous emulsions but so far as we know, the emulsions produced therewith have all been of limited utility, and the processes employed have been comparatively complicated and expensive.

In the Mohave desert regions of southern California, there occurs a colloidal hydrous magnesium silicate, which apparently possesses many characteristics quite different from those common to previously known magnesium silicates, such as talc and meerschaum, for example. The following is a typical analysis of this material:

| | |
|---|---|
| Silica | 47.40% |
| Alumina | .29% |
| Ferric oxide | .06% |
| Calcium oxide | 8.10% |
| Magnesia | 22.15% |
| Soda and potash | 2.54% |
| Sulphur trioxide | .05% |
| Water at 105° C | 7.63% |
| Loss on ignition | 11.27% |
| Fusion point | 2410° F. |

In addition, it is characterized by an absorption quality of 75%. For lack of a better identification and to distinguish it by name as far as possible from other magnesium silicates, we have termed this material a "colloidal hydrous magnesium silicate", and wherever this last-mentioned term is used in the specification and claims, it is to be understood that a magnesium silicate of the approximate character above defined is meant.

We have discovered that this colloidal hydrous magnesium silicate is an extraordinarily effective emulsifying agent, and one of the objects of the present invention is to provide a novel bituminous emulsion including this matter as a reagent, because it possesses the distinct advantage over clay and bentonite for emulsification purposes, due to its very rapid curing and setting characteristics, as compared to clay and bentonite, and because it becomes irreversible in a very much shorter period of time. We have also invented a novel method of making emulsions and novel means of process control by which asphalt and other emulsions of an extremely fine state of dispersion as to the bitumen may be produced in a single emulsifying vessel of the agitator type.

A further new and valuable feature of our invention is that dilute as well as concentrated asphalt emulsions, may be initially produced in the vessel itself. It has heretofore, been considered necessary to keep the bath in the vessel of a high viscosity in order to effect fine dispersion and to dilute the product to the comparatively dilute form required for certain applications (such as spray work). We have found out that a dilute emulsion formed in the machine itself by our invention is much more stable and that the disperse phase will remain longer in perfect suspension than an emulsion of the same dilution formed by subsequent dilution of a more highly concentrated emulsion formed in the machine. This fact we deem of great commercial importance.

We employ our invention in the formation of emulsions of various substances, such as asphalt, tar, pitch, waxes and resins, and do not wish to limit the application of our invention merely to asphalt emulsion and process of making the same and although we will now proceed to describe one illustration of our method and product we do not wish to be limited to the method and product described.

We should first disclose that heretofore in the use of mineral powder emulsifying agents, and, in fact, also in the cases of many vegetable colloids which have been used, it has been the practice to employ several per cent of the re-agent from 6% to 10% being rather common and in some cases as much as 30% or more is employed.

In order to secure superior disperson and effectiveness of the product, we now prefer to use an amount of hydrous magnesium silicate which is less than 1½% by weight of the amount of emulsion produced.

As illustrations of our invention we may take the following materials and emulsify them according to the method later described after the formulae.

36 gallons of asphalt
10 pounds of colloidal hydrous magnesium silicate digested with 20 gallons water
420 c. c. of a $\frac{1}{10}$ N. solution of acetic acid
22 gallons water.

This will produce a stable emulsion of suitable consistency for spray purposes, or we may take 36 gallons of asphalt
8 pounds of colloidal hydrous magnesium silicate digested with 20 gallons water
250 c. c. of $\frac{1}{10}$ N. solution of acetic acid
10 gallons water.

This will produce a concentrated emulsion suitable for waterproofing, shipment, or purposes where an emulsion paste is an effective form in which to use asphalt.

The procedure may be by batch or continuous as is well known in the art.

Figure 2:
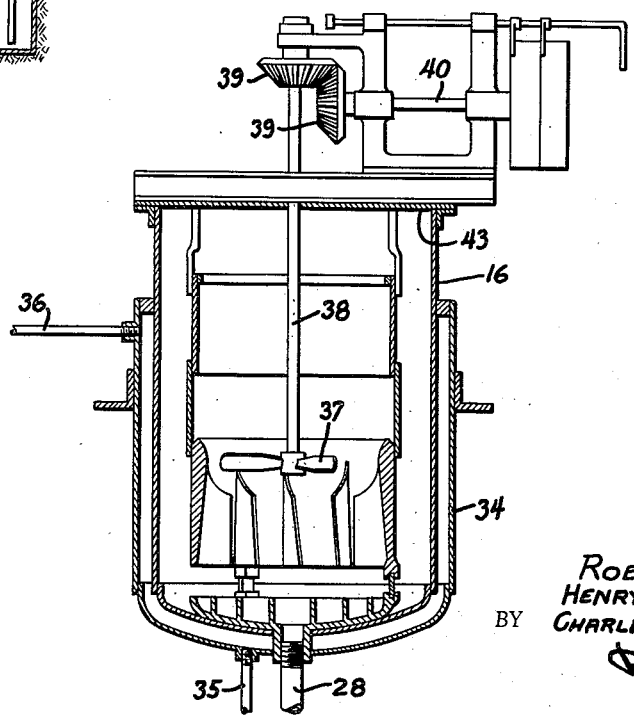

In the practice of our invention we may employ an apparatus as shown in the accompanying drawing wherein:

Fig. 1 is a side elevation partly in section showing an apparatus embodying the features of our invention, and Fig. 2 is an enlarged sectional view showing an emulsifier which may be used in connection with our invention.

Referring to the drawing by reference characters, we have shown an asphalt storage tank at 10. This tank is supported on suitable standards 11. The tank 10 is connected by a pipe 12 with a measuring tank 14. This measuring tank is in turn connected by a pipe 15 with an emulsifier 16. Suitable valves 17 and 18 are provided so that the measuring tank may be utilized.

A mixing tank is shown at 19. In this mixing tank we place ingredients to make an aqueous solution of colloid. This tank 19 is connected by a pipe 20 with a measuring tank 21. A pump 22 serves to force the colloidal solution through the pipe 20. This pump 22 may be driven by a belt 23 from a motor 24 or it may be driven in any other desired manner. The tank 21 is connected by means of a pipe 25 with the emulsifier 16. Valves 26 and 27 are arranged so that the measuring tank 21 may be operated.

The delivery pipe 28 from the emulsifier is controlled by a valve 29 and delivers into a product storage tank 30. The material in the product storage tank 30 may be removed through the pipe 31 which is connected to a pump 32 and this pump delivers to a discharge pipe 33. The pump 32 is driven by a belt 33' driven by the motor 24.

The emulsifier per se forms no part of our present invention but may be made of any type. In the drawing it is shown as comprising a case having a steam jacket 34 thereabout. Steam is supplied to the jacket through a pipe 35 while exhaust steam passes through a pipe 36.

This jacket serves to keep the mixture in the emulsifier at the proper temperature.

The emulsifier is shown as provided with a beater 37 which may be driven by a shaft 38 which in turn is driven by gears 39 from a shaft 40. The shaft 40 is driven from the belt 41 which is driven by a belt 42 operated by the motor 24. The emulsifier is provided with a cover 43 which serves to prevent the escape of fumes.

The asphalt is run from the storage tank into the emulsifying vessel 16 which by use of the agitator and the deflecting vanes and annular ring induces good circulation and the formation of a vortex shaped bath of emulsion previously formed.

While the asphalt is running into the vessel 16 the required amount of colloidal hydrous magnesium silicate paste is introduced into the vessel from the tank 21 through pipe 25.

The asphalt is run in as rapidly as is consistent with filming out on the vortex and the avoidance of chilled clots of asphalt. As soon as asphalt and gel or paste feeding has been completed, the acid is added (through a pipe not shown) and in amount such that incipient coagulation of the imperfectly formed emulsion is caused. The proper amount to use will necessarily vary with the quality (acidity or alkalinity) of the other ingredients (asphalt, water, magnesium silicate), and may be gauged by measuring the pH value in the bath.

The rate of rotation of the agitator which is in operation may well be increased at this point by speeding up the motor 24 and agitation is continued until the desired degree of dispersion is effected. This may be gauged by the smooth, velvety sheen which the bath takes on as dispersion is perfected, or by periodic dilution tests upon small samples drawn from the bath. As completed, the product is drawn off at the base of the vessel and the procedure repeated.

As is already generally known, a proper relationship should be maintained between the temperature of the bath and of the incoming asphalt. This will of necessity vary with the grade of the asphalt.

As an illustration when emulsifying asphalt of a M. P. of 115, the asphalt may be introduced at a temperature of 250-300 F. and the bath maintained at about 110-120 F.

The requisite amount of water is introduced throughout the process through a supply pipe not shown, and temperature controlled by steam or cooling water passed through the jacket of the vessel.

Our invention further includes the use of reagents which comprise an abnormally low amount of colloidal hydrous magnesium silicate and a protective colloid, such as starch or casein.

The usual amounts of starch when used as an emulsifying agent are approximately 5 to 8% of the entire weight of the emulsion produced. When such colloid is combined with colloidal hydrous magnesium silicate and used as the emulsifying agent the amount used to secure the best results will be a percentage of ¾ of 1% (or less) of colloidal hydrous magnesium silicate and ¼ of 1% vegetable or organic colloid.

Having thus described our invention, we claim:

1. An emulsion consisting of approximately 36 gallons of asphalt, a colloidal solution consisting of 10 pounds of colloidal hydrous magnesium silicate and 20 gallons of water, 420 cc. of a $\frac{1}{10}$ N. solution of acetic acid, and water.

2. An emulsion consisting of approximately 36 gallons of asphalt, a solution of 8 pounds of colloidal hydrous magnesium silicate digested with 20 gallons of water, 250 cc. of a $\frac{1}{10}$ N. solution of acetic acid, and 10 gallons of water.

ROBERT K. PAINTER.
HENRY H. MORETON.
CHARLES W. HILL.